United States Patent Office 2,750,390
Patented June 12, 1956

2,750,390

NICOTINIC ACID ESTER

Theodore I. Fand, White Plains, and Robert H. Broh-Kahn, Hastings on Hudson, N. Y., assignors to Nepera Chemical Co., Inc., Yonkers, N. Y., a corporation of New York No Drawing. Application March 14, 1955, Serial No. 494,258

5 Claims. (Cl. 260—295.5)

This invention relates to a novel ester of nicotinic acid and relates more particularly to the nicotinic acid ester of mephenesin, 3-o-toloxy-1,2-propanediol, corresponding to the formula

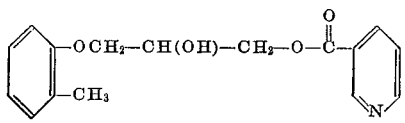

This novel ester may be more specifically described as 1-(2-hydroxy-3-toloxy) propyl nicotinate.

An object of this invention is the provision of a new and improved muscular relaxant and particularly one which exhibits the desirable properties of mephenesin, i. e. 3-o-toloxy-1,2-propanediol, but whose chemotherapeutic index is more favorable.

Another object of this invention is the preparation of a muscular relaxant related to mephenesin but which is more prolonged in its action.

Other objects of this invention will appear from the following detailed description.

The desirable muscle relaxant properties of 3-o-toloxy-1,2-propanediol are well known but wider acceptance of this compound has not been attained for a number of reasons. One of the principal reasons for the limited use of this compound is that the desired therapeutic effect is obtained only by administering the compound in relatively large doses. Such large doses necessarily greatly lower the chemotherapeutic index, thus reducing the margin of safety. Another reason appears to be that the effects of single doses of this compound are frequently only of rather temporary effect which also limits the value of this drug.

We have now found that by esterifying myanesin with nicotinic acid to form the nicotinic acid ester of myanesin, 1-(2-hydroxy-3-toloxy) propyl nicotinate, not only are the desirable muscle relaxant properties of the myanesin moiety retained but, surprisingly enough, the chemotherapeutic index is greatly increased. In addition, on intravenous administration, the nicotinic acid ester of myanesin is far more effective on an equimolecular basis than myanesin itself.

The nicotinic acid ester of mephenesin may be obtained by reacting myanesin with nicotinic acid or with the anhydride of nicotinic acid in a suitable inert solvent medium. The ester may also be obtained by reacting mephenesin with nicotinoyl chloride in a suitable inert solvent medium. Preferably, the esterification is carried out with the reactants being employed in substantially equimolecular quantities.

In order further to illustrate our invention but without being limited thereto, the following examples are given:

Example I 177 parts by weight of the hydrochloride of nicotinoyl chloride and 182.2 parts by weight of mephenesin are mixed in about 500 parts by weight of pyridine and the resulting mixture then brought up to and maintained at steam bath temperature for one hour. The solvent is then distilled off under low pressure and about 5000 parts by weight of water added. The aqueous mixture is treated with an excess of sodium bicarbonate and then exhaustively extracted with ether. The ether extracts are combined, dried over anhydrous sodium sulfate, filtered, and the ether then removed by distillation to leave a viscous residue. The residue is taken up in ether and an excess of a solution of hydrogen chloride in ether is added forming a dense white precipitate. The supernatant liquid is decanted and the precipitate taken up in about 800 parts by weight of methanol. The mixture is triturated until the precipitate becomes crystalline. After an excess of anhydrous ether is added, the precipitate is filtered off and washed with ether-methanol solution. A quantitative yield of the hydrochloride of 1-(2-hydroxy-3-toloxy) propyl nicotinate is obtained, melting at 163–164° C. Analysis for HCl content is 11.6%, the theoretical being 11.3%.

Example II

The hydrochloride of 1-(2-hydroxy-3-toloxy) propyl nicotinate may be converted to the free base by dissolving the hydrochloride in water, neutralizing the aqueous solution with sodium bicarbonate and extracting the oil phase which separates with ether. On evaporating the ether solution, the free ester separates and solidifies at room temperature. The 1-(2-hydroxy-3-toloxy) propyl nicotinate thus obtained melts at 79–80° C. Nitrogen analysis is, found N=5.08%; theoretical N=4.9%.

The 1-(2-hydroxy-3-toloxy) propyl nicotinate may be readily converted to other therapeutically useful salts such as the hydrobromide, the sulfate, etc. by neutralizing the free ester base with the desired acid in a solvent such as water and then evaporating the water.

It is understood that the foregoing detailed description is given merely by way of illustration and that many variations may be made therein without departing from the spirit of our invention.

Having described our invention, what we desire to secure by Letters Patent is:

1. The ester 1-(2-hydroxy-3-toloxy) propyl nicotinate and the non-toxic acid salts thereof.

2. 1-(2-hydroxy-3-toloxy) propyl nicotinate hydrochloride.

3. Process for the production of the nicotinic acid ester of mephenesin, which comprises reacting mephenesin with a member of the group consisting of nicotinic acid, nicotinic acid anhydride and nicotinoyl chloride.

4. Process for the production of the nicotinic acid ester of mephenesin, which comprises reacting mephenesin with a member of the group consisting of nicotinic acid, nicotinic acid anhydride and nicotinoyl chloride in an inert solvent medium.

5. Process for the production of the nicotinic acid ester of mephenesin, which comprises reacting mephenesin with a member of the group consisting of nicotinic acid, nicotinic acid anhydride and nicotinoyl chloride in an inert solvent medium, said reactants being present in substantially equimolecular ratio.

No references cited.